Patented July 29, 1924.

1,503,013

UNITED STATES PATENT OFFICE.

EARL BURNARD ALVORD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING SODIUM SULPHIDE.

No Drawing.  Application filed May 15, 1922. Serial No. 561,020.

*To all whom it may concern:*

Be it known that I, EARL BURNARD ALVORD, a citizen of the United States, residing at Cleveland, in the county of Cuyahoga and State of Ohio, have invented certain new and useful Improvements in Processes of Making Sodium Sulphide, of which the following is a specification.

In the process commonly employed for the manufacture of sodium sulphide on a commercial scale, sodium sulfate is reduced to the sulphide usually by heating a mixture of sodium sulfate and coal in a furnace. The furnace product is an impure mixture containing unchanged sodium sulfate, unconsumed fuel, ash from the fuel, secondary products of the reaction such as, sodium carbonate and sodium hyposulfite and varying quantities of sodium sulphide. Sodium sulphide is recovered from the furnace product by leaching. One of the disadvantages of this process is the low yield of sodium sulphide, which may be attributed to incomplete reaction, secondary reactions and loss of sodium sulphide incidental to the recovery of sodium sulphide from the furnace product.

In an application entitled Process of making sodium sulphide, filed by Henry Howard on March 30, 1922, Serial No. 548,186, is described a process of making sodium sulphide by treating solutions containing the same and sodium carbonate such as the crude solutions of sodium sulphide formed by leaching black ash residues with lime and hydrogen sulphide, whereby the sodium carbonate content thereof is converted to sodium sulphide.

I have found that the mentioned treatment with lime and hydrogen sulphide for the conversion of sodium carbonate content of a sodium sulphide solution to sodium sulphide may also serve to convert sodium sulfate and other sodium salts, the acid radicals of which are capable of forming water insoluble salts with calcium, to sodium sulphide, and my invention therefore relates to the production of sodium sulphide from impure solutions thereof containing such sodium salts by the treatment thereof with lime and hydrogen sulphide.

The process is particularly applicable for the recovery of sodium sulphide from dilute solutions or liquors containing sodium sulfate, with other sodium salts which cannot be readily separated from the sodium sulphide by crystallization. Such liquors are produced in fairly large quantities in the process of making sodium sulphide by reduction of the sulfate as described above. In this process the black ash is first leached with only sufficient water to produce a strong solution of the sodium sulphide whereby the impurities including sodium carbonate, sodium sulfate, and sodium hyposulfite are left in the undissolved residue along with a considerable proportion of the sodium sulphide content of the black ash. It is customary to further leach this residue with a relatively large amount of water to separate the soluble sodium salts from the fuel and ash whereby dilute solutions containing sodium sulphide, sodium carbonate, sodium sulfate and small amounts of other salts such as sodium hyposulfite are produced. Methods now known for the recovery of sodium sulphide from such solutions are not satisfactory and the solutions are either wasted or used for some other purpose.

I have found that sodium sulphide in commercially pure form may be economically recovered from dilute solutions of sodium sulphide containing sodium sulfate or sodium sulfate and carbonate by an application of my process as follows:

To the dilute solution containing sodium sulphide and sodium sulfate or sulfate and carbonate is added lime in quantity theoretically sufficient to convert the sodium salts other than the sulphide to sodium hydroxid. The conversion of sodium salts to the hydroxid by reaction with lime is not complete. Hydrogen sulphide is then added to the solution either in gaseous form or in the form of a solution in water as a result of which the sodium hydroxid is converted to sodium sulphide. Sodium hydroxid being removed from the sphere of reaction the reaction between lime and the sodium salts forming sodium hydroxide proceeds substantially to completion. When sufficient hydrogen sulphide has been added to convert the sodium hydroxid to sulphide, that is, a quantity chemically equivalent to the quantity of lime added, the solution is separated from the precipitate of calcium sulfate or carbonate or a mixture of the two depending upon whether the solution contained sodium carbonate or sulfate or both. This purified solution contains all of the sodium sulphide of the original impure solution and in addition the sodium sulphide formed in the purifying process. Sodium sulphide is recovered by evaporation or crystallization in the well known manner.

I claim:

1. Process of purifying solutions of sodium sulphide containing sodium sulfate which comprises treating such solutions with lime and hydrogen sulphide in quantity sufficient to convert the sodium sulfate to sodium sulphide.

2. Process of purifying solutions of sodium sulphide containing sodium sulfate and sodium carbonate which comprises treating such solutions with lime in quantity sufficient to combine with the carbonate and sulfate and with hydrogen sulphide in quantity chemically equivalent to said lime.

3. Process of purifying solutions of sodium sulphide produced by leaching black ash residues which comprises adding thereto lime in quantity sufficient to combine with acid radicals present therein capable of forming water-insoluble calcium compounds and with hydrogen sulphide in quantity chemically equivalent to said lime.

In testimony whereof, I affix my signature.

EARL BURNARD ALVORD.